Patented Dec. 11, 1928.

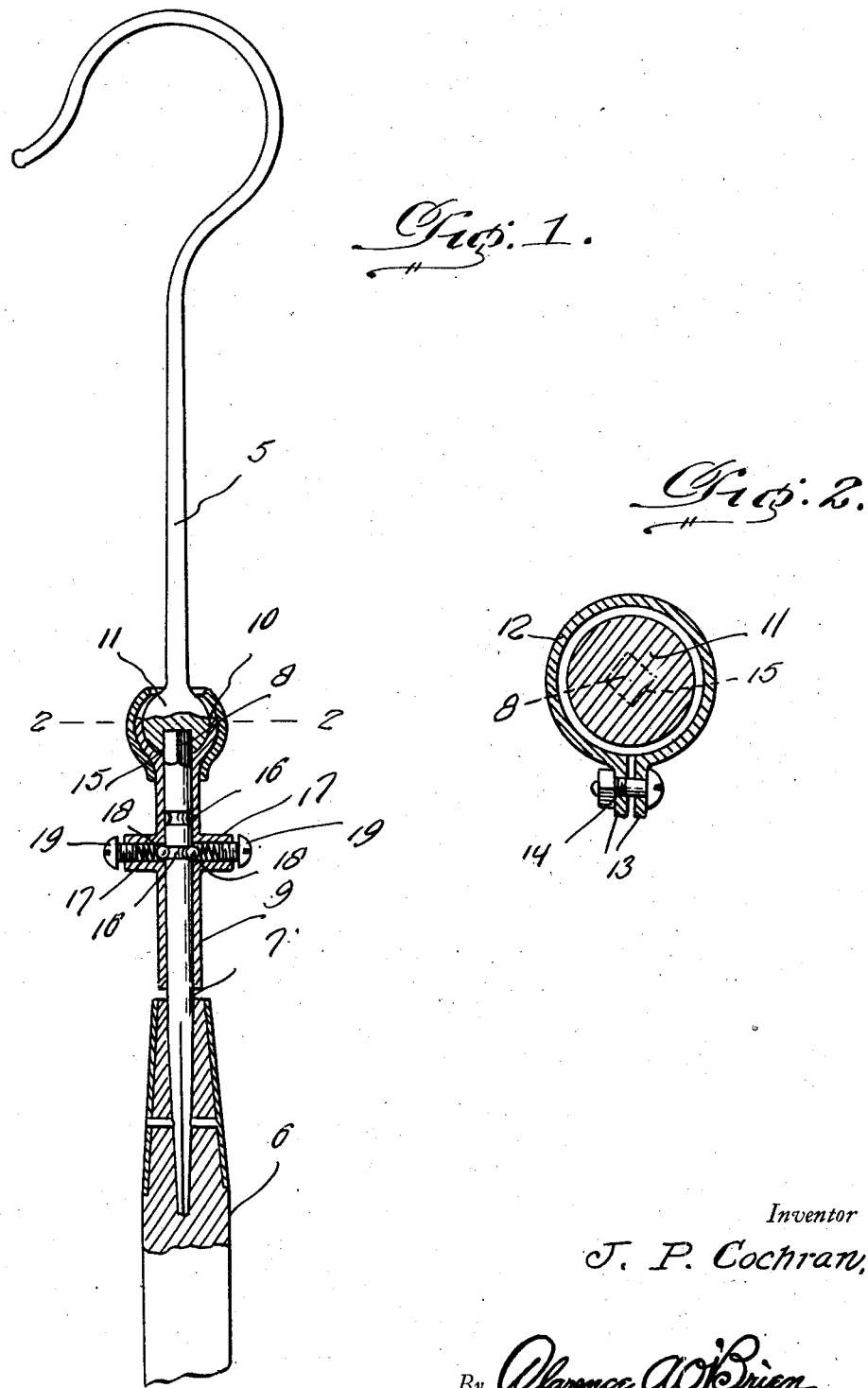

1,695,009

UNITED STATES PATENT OFFICE.

JAMES P. COCHRAN, OF CANYON CITY, OREGON.

TOOL AND HANDLE CONNECTION.

Application filed May 6, 1927. Serial No. 189,278.

This invention relates to new and useful improvements in tools such as sheep hooks, spears, fish gigs, or the like, and aims to provide a connection between a head of a tool of this character and the handle thereof to facilitate the rigid securing of the head to the handle or the releasing of the head with respect to the handle so that the head may have a universal movement upon the handle which is frequently necessary, or at least desirable in tools of this general character.

In carrying out the present invention there is provided a highly novel, simple, and inexpensive structure between a head and handle of a tool of this general type wherein the head may be rigidly anchored to the handle or wherein the same may be so released and this in an easy manner as to permit of the head to swing universally upon said handle.

In the drawing wherein like reference characters indicate corresponding parts throughout both of the views:

Figure 1 is a fragmentary view partially in elevation and particularly in cross section disclosing my improved structure as employed in connection with a sheep hook, the structure of the invention per se being disclosed in longitudinal cross section, and Figure 2 is a transverse section taken substantially upon the line 2—2 of Figure 1.

Now having particular reference to the drawing 5 designates a tool head which in the present instance is shown in the form of a hook. However, I do not desire to be limited to such a use as my invention may be equally as well employed in conjunction with spears, fish gigs and the like. Furthermore there is provided a suitable handle 6. Arranged securely within one end of this handle 6 which is usually of wood is the pointed end of an elongated pin 7 rounded throughout the major portion of its length and squared at its outer end as at 8. Slidably arranged upon this pin 7 is an elongated sleeve 9 formed at its outer end with a semi-spherical socket 10. The inner end of the head 5 of the tool is provided with a ball 11 loosely disposed within the semi-spherical socket 10. Arranged around this socket 10 is a split rounded sleeve 12 having a large opening at its upper end through which the shank of the tool head 5 projects, said sleeve 12 being provided with clamping ears 13 interconnected by a bolt 14 which when tightened prevents the detachment of the sleeve from the socket 10 and the consequent detachment of the ball 11 of the tool head 5 from said socket 10.

The inner end of the said ball 11 is formed with a squared socket 15 for receiving the squared end of the elongated handle attached pin 7. Furthermore, this pin 7 is formed within the confines of the sleeve 9 with spaced circumferential channels 16—16. Said sleeve 9 is formed at opposed sides with lateral sleeves 17—17 communicating with the interior of said elongated sleeve 9, and within which are arranged spring pressed balls 18—18 for engagement within either of the spaced channels 16—16 of the said pin 7. Threaded within the outer end of these sleeves 17—17 are screws 19—19 for tensioning the springs so as to maintain the balls within the proper channel against accidental displacement. Obviously when the sleeve 9 is forced inwardly upon the pin 7 so as to engage the balls within the innermost channel 16 the squared end 8 of said pin 7 will engage in the socket of the tool head ball 11. However, when this sleeve 9 is forcibly moved outwardly so as to engage the balls within the outermost channel, the pin will be disconnected from the tool head ball permitting the head to have a universal movement upon the end of the handle.

It will thus be seen that I have provided a highly novel, simple, and efficient connection between the handle and head of tools of a certain general character and even though I have herein shown and described the invention as consisting of certain detail structural elements it is nevertheless to be understood that some changes may be made therein without affecting the spirit and scope of the appended claim.

Having thus described the invention, what I claim is:—

In a tool and handle connection, a tool provided with a ball-shaped head formed with an angular socket, a handle, a pin projecting from one end of the handle, said pin having a pair of spaced circumferential grooves, a sleeve for slidable disposition on the pin and provided at one end with a socket shell in which the tool end is seated, a boss projecting laterally from an intermediate point on the sleeve and having a bore extending inwardly and communicating with the interior of the sleeve, a spring urged member within the said bore adapted for selective engagement within one of the said circumferential grooves of the pin, one end of said pin being of polygonal shape for engagement with the socket of said tool head, said sleeve being movable on the pin for disengaging the polygonal shaped end of the pin from the tool head socket and resulting in the engagement of the said spring urged member in the outermost groove of the pin to permit the ball-shaped head to pivot within the socket shell of the sleeve.

In testimony whereof I affix my signature.

JAMES P. COCHRAN.